US010363515B2

(12) United States Patent
DiCarlo (10) Patent No.: US 10,363,515 B2
(45) Date of Patent: Jul. 30, 2019

(54) ATMOSPHERIC NEGATIVE IONIZER

(71) Applicant: Mark DiCarlo, Eugene, OR (US)

(72) Inventor: Mark DiCarlo, Eugene, OR (US)

(*) Notice: Subject to any disclaimer, the term of this patent is extended or adjusted under 35 U.S.C. 154(b) by 315 days.

(21) Appl. No.: 15/342,104

(22) Filed: Nov. 2, 2016

(65) Prior Publication Data

US 2018/0117521 A1  May 3, 2018

(51) Int. Cl.
| | |
|---|---|
| *B01D 53/00* | (2006.01) |
| *B01D 46/00* | (2006.01) |
| *B01D 47/06* | (2006.01) |
| *B01D 50/00* | (2006.01) |
| *B64B 1/00* | (2006.01) |
| *B01D 53/14* | (2006.01) |
| *B01D 53/32* | (2006.01) |

(52) U.S. Cl.
CPC ....... *B01D 53/007* (2013.01); *B01D 46/0023* (2013.01); *B01D 47/06* (2013.01); *B01D 50/006* (2013.01); *B01D 53/14* (2013.01); *B01D 53/32* (2013.01); *B64B 1/00* (2013.01); *B01D 2247/12* (2013.01); *B01D 2258/06* (2013.01); *B01D 2259/4575* (2013.01); *B01D 2279/40* (2013.01); *B64B 2201/00* (2013.01)

(58) Field of Classification Search
None
See application file for complete search history.

(56) References Cited

U.S. PATENT DOCUMENTS

| | | | | |
|---|---|---|---|---|
| 2,065,146 | A * | 12/1936 | Morse | B64C 25/14 244/102 R |
| 3,958,958 | A * | 5/1976 | Klugman | B03C 3/16 95/64 |
| 5,147,429 | A * | 9/1992 | Bartholomew | B01D 46/42 244/30 |
| 5,518,696 | A * | 5/1996 | Jain | B01D 53/504 169/54 |
| 5,912,396 | A | 6/1999 | Wong | |
| 6,375,714 | B1 * | 4/2002 | Rump | A61L 9/22 361/235 |
| 8,460,430 | B2 | 6/2013 | Baumgartner | |
| 8,961,651 | B1 | 2/2015 | Gokturk | |
| 2003/0066421 | A1 * | 4/2003 | Ku | B01D 47/06 95/149 |

(Continued)

FOREIGN PATENT DOCUMENTS

| | | |
|---|---|---|
| EP | 0554591 A1 | 8/1993 |
| EP | 0654640 B1 | 5/2000 |

(Continued)

OTHER PUBLICATIONS

JP-2003181276-A English Translation (Year: 2003).*

(Continued)

*Primary Examiner* — Anita Nassiri-Motlagh
(74) *Attorney, Agent, or Firm* — Kwan & Olynick LLP (57) ABSTRACT

This disclosure relates to a system that provides an environmentally friendly method to clean air over towns and cities. The system utilizes tourmaline filters and rocks, sunlight, and water to simulate the cleaning properties of waterfalls in order to create an ionized surface within a cylindrical tube and creates raindrops and mist to simulate precipitation. The system eliminates pollutants instead of transferring them to the surrounding environment.

26 Claims, 10 Drawing Sheets

(56) References Cited

U.S. PATENT DOCUMENTS

| | | | |
|---|---|---|---|
| 2003/0231459 | A1 | 12/2003 | Robertson |
| 2005/0204713 | A1* | 9/2005 | Wu .................... B01D 46/0005 55/496 |
| 2005/0252177 | A1* | 11/2005 | Ishikawa ............ B01D 39/2093 55/282.3 |
| 2006/0150819 | A1 | 7/2006 | Yuen |
| 2008/0014857 | A1 | 1/2008 | Spadafora |
| 2011/0049257 | A1 | 3/2011 | Bologurov |
| 2011/0062779 | A1* | 3/2011 | Reichart ................ B60L 8/003 307/10.1 |
| 2013/0168234 | A1 | 7/2013 | Lin |
| 2015/0147952 | A1* | 5/2015 | Pfannenberg ...... H05K 7/20009 454/184 |
| 2016/0197457 | A1* | 7/2016 | Gan ........................ H01T 23/00 361/231 |

FOREIGN PATENT DOCUMENTS

| | | | |
|---|---|---|---|
| JP | 2003181276 A | * | 7/2003 |
| JP | 2010242733 A | * | 10/2010 |

OTHER PUBLICATIONS

JP-2010242733-A English Translation (Year: 2010).*
Cote', J. (Feb. 11, 2007). "The Ion Miracle. The effects of negative ions on physical and mental well-being." *Francois Lepine Publishing*, pp. 68-81).
Judd, C., Research Specialist and Independent Wellness Consultant. (Apr. 14, 2010). "Negative Ions Vs Positive Ions. The effects of negative ions on physical and mental well-being." *Tree Sap Enterprises*. Retrieved from http://ezinearticles.com/?Negative-Ions-Vs-Positive-Ions&id=4112374.
Lee, J. (Mar. 2000). "Zapping Airborne Salmonella and Dust." *Agricultural Research. U.S. Department of Agriculture. Agricultural Research Service*, pp. 20-21. Judd, C., Research Specialist and Independent Wellness Consultant. (Apr. 14, 2010). "Negative Ions Vs Positive Ions. The effects of negative ions on physical and mental wellbeing." *Tree Sap Enterprises*. Retrieved from http://ufdc.ufl.edu/UF00074949/00033/20j.
Good Housekeeping Institute Report: 1-800-WEIRDPRODUCTS. (Mar. 1999). *Good Housekeeping Magazine*, p. 123.
Kirshenblat, E. (Jan. 17, 2014. "Got dirty air? Try washing it." *China Daily USA*. Retrieved from http://usa.chinadaily.com.en/epaper/2014-01/17/content_17241678.htm http://usa.chinadaily.com.cn/epaper/2014-01/17/content_17241678.htm.
Lendino, J. (Apr. 20, 2015). "A fully transparent solar cell that could make every window and screen a power source (updated)." *Extreme Tech*. Retrieved from http://www.extremetech.com/extreme/188667-a-fully-transparent-solar-cell-that-could-make-every-window-and-screen-a-power-source.
"Photovoltaic Systems on Buildings." (2013). *Green Rhino Energy, Ltd*. Retrieved from http://www.greenrhinoenergy.com/solar/technologies/pv_mounting.php.
Tourmaline—The Electric Stone. (2005-2012). *Magma Health, LLC*. Retrieved from http://www.kiflow.com/info/tourmaline.html.
Schuman, W. (Dec. 1, 2009). "Gemstones of the World, Newly Revised & Expanded Fourth Edition." *Sterling*, p. 128.
Nemoto, M. (1999-2015). "You state that negative ions are found around a waterfall." Does rain or my shower produce negative ions? *IonTrading. Universal Plan Co., Ltd*. Retrieved from http://www.n-ion.com/e/faq-04-34.html.
Madl, P. Del Guidice, E., Voeiko, VL., Tedeschi, A., Kolarž, P., Gaisberger, M., and Hartl, A. (2013). "Evidence of Coherent Dynamics in Water Droplets of Waterfalls." *Water Journal, Multidisciplinary Research Journal*, vol. 5, pp. 60-61. Retrieved from http://www.waterjournal.org/uploads/vol5/madl/WATER.2013.7.Madl.pdf.
Kolarž, P., Gaisberger M., Madl, P., Hofmann. W., Ritter, M., and Hartl, A.. 2012, "Characterization of Ions at Alpine Waterfalls," Atmospherics Chemistry and Physics, 12, p. 3687. Retrieved from http://www.atmos-chem-phys.net/12/3687/2012/acp-12-3687-2012.pdf.
Soyka, F. and Edmonds, A. (1977). "The Ion Effect." *Bantam Books, Inc*., p. 24.
Lovett, R.A. (Sep. 25, 2011.) "Global Warming Silver Lining? Arctic Could Get Cleaner." *National Geographic News*. Retrieved from http://news.nationalgeographic.com/news/2011/09/110923-global-warming-soot-air-pollution-science-environment/.
"Int'l Application Serial No. PCT/US2016/061720, Search Report & Written Opinion dated Jan. 23, 2017", 8 pgs.

* cited by examiner

FIG. 11

ATMOSPHERIC NEGATIVE IONIZER

FIELD

Example embodiments of the present disclosure generally relate to systems and methods for reducing air pollution.

BACKGROUND

Over the past several years in particular, there has been an increasing concern about the level of pollution in the atmosphere, as well as attempts of various kinds for atmospheric remediation. According to the World Health Organization, it is estimated that approximately 5 million people die each year due to various causes related to atmospheric pollution. Thus, atmospheric pollution is one of the world's largest environmental health risks.

Environmental regulations restrict the emissions of many of the most hazardous pollutants including sulfur oxides, nitrogen oxides, mercury and particulate matter. A number of remediation methods have been developed in order to reduce various emissions to within the limits permitted by the regulations. One promising method for reducing atmospheric pollution uses ionization as a means to remove harmful atmospheric pollutants.

Various techniques and apparatus are known in the art for modifying atmospheric conditions through ionization. Further, ionization technologies are thought to be less environmentally hazardous than introducing chemical agents or other technologies that require fossil fuels. For example, ionizers may be used to effectively change convective flows of ionized air in the atmosphere over a targeted surface area This ionization may further change atmospheric water and water vapor to alter local conditions with little negative environmental impact.

U.S. Pat. No. 5,912,396 to Wong, discloses a system and corresponding method for remediation of atmospheric pollution by producing a large amount of electrical charge using an emitter electrode. The ionization means is positioned in a selected region of space, so as to make the large volume of electrical charges available in a given volume. Consequently, the atmospheric pollutants in the given volume are neutralized resulting in the remediation of the given volume.

U.S. Pat. No. 8,961,651 to Gokturk discloses an apparatus and corresponding method of reducing pollutants in a flue gas by providing electrons to convert the pollutants with positive electron affinity to negative ions. Thus, the charged pollutants can attract other pollutants with dipole properties to form clusters of pollutants. The pollutants may then be separated from the rest of the flue gas using electric and magnetic fields.

U.S. Pat. No. 8,988,847 B2 to Bologurov et al., discloses an apparatus comprising an air ionizer, where a shielding electrode, an emitting electrode and an extracting electrode are arranged in a parallel way. Then, then electrodes may be directed to targeted angles of inclination to generate convective flows and/or spatial charges in a controlled way to affect atmospheric conditions.

However, the above prior art lacks a method to mimic or replicate natural atmospheric remediation. Thus, there is a need in the art for a system and corresponding method that provide a green solution to replicate the natural processes to clean the air. The system and method also may capture atmospheric pollution rather than transferring pollutants to other parts of the ecosystem.

SUMMARY

The disclosure, particularly relates to a system and corresponding method for remediating polluted air and reducing health risk by producing negative ions into atmosphere via a combination of sunlight, tourmaline and water; and by creating raindrops and mist to simulate precipitation.

The inventive aspects can be embodied in a system that cleans air in a similar way as natural remediation processes and further eliminates pollutants instead of transferring them to other parts of the ecosystem including soils and ground water. The inventive aspects can be further embodied in system that utilizes tourmaline filters and rocks, water and sunlight in a unique way for the remediation of air. The other inventive aspects can be embodied in a system that utilizes tourmaline filters, sunlight and water to simulate a waterfall to create an ionized surface within a cylindrical tube and a system that creates raindrops and mist to simulate weather precipitation. Yet other inventive aspects can be embodied in a system that provides an environmentally friendly way to clean air around towns and cities.

In this respect, before explaining at least one embodiment of the disclosure in detail, it is to be understood that the disclosure is not limited in its application to the arrangements of the components set forth in the following description and it is not limited to the details of construction or the details illustrated in the drawings. The disclosure is capable of other embodiments and of being practiced and carried out in various ways. Also, it is to be understood that the phraseology and terminology employed herein are for the purpose of description and should not be regarded as limiting.

These together with other objects of the disclosure, along with the various features of novelty which characterize the disclosure, are pointed out with particularity in the disclosure. For a better understanding of the disclosure, its operating advantages and the specific objects attained by its uses, reference should be had to the accompanying drawings and descriptive matter in which there are illustrated preferred embodiments of the disclosure.

BRIEF DESCRIPTION OF THE DRAWINGS

The disclosure will be better understood and objects other than those set forth above will become apparent when consideration is given to the following detailed description thereof.

DETAILED DESCRIPTION

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and is to be understood that the embodiments may be combined, or that other embodiments may be utilized and that structural, logical and electrical changes may be made without departing from the spirit and scope of the present disclosure. The following detailed description is, therefore, not to be taken in a limiting sense, and the scope of the present disclosure is defined by the appended claims and their equivalents.

It will be understood that when an element is referred to as being "connected" or "coupled" to another element, it can be directly connected or coupled to the other element or intervening elements may be present.

The terminology used herein is for the purpose or describing particular embodiments only and is not intended to be limiting of example embodiments of the inventive concepts. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The present disclosure is a system that provides a green solution by replicating the way nature cleans the air. Further, instead of transferring pollution related particles from the air to other parts of the ecosystem such as the soil/water, the system captures pollutants and eliminates them entirely from the environment. Once captured, the pollutant particles are removed completely with a biodegradable and/or environmentally friendly cleaning solution that will eliminate the targeted pollution from the environment and thus the harmful effects. The present disclosure may be placed on the top of buildings or transported into the air via hybrid airships and/or other air vehicles.

Additionally, the system may be utilized to reduce airborne contaminants inside buildings (e.g., industrial plants, waste factories, hospitals, laboratories and facilities). The system may also be used during emergencies and natural disasters (e.g., fires, earthquakes, etc.) to neutralize and/or eliminate airborne contaminants.

Figure 1:
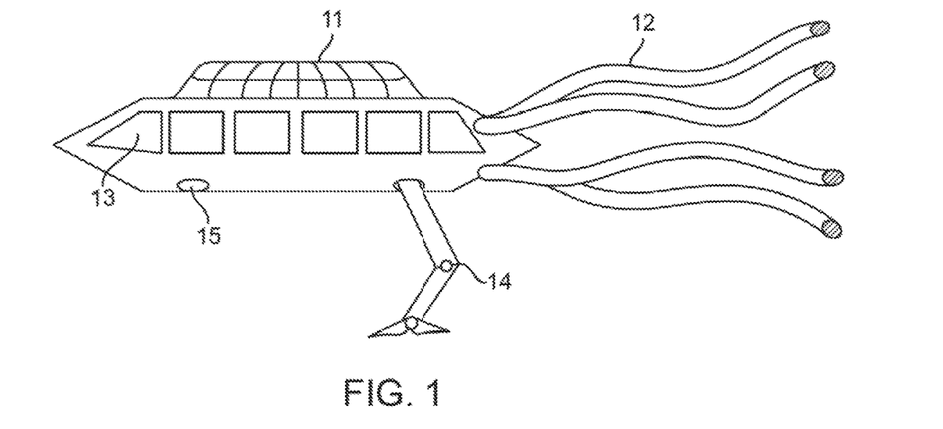
FIG. 1 shows the side view of a vehicle system for air remediation, in accordance with an example embodiment.

FIG. 1 shows a system that may be attached to a typical air vehicle that is airborne or placed on top of, or inside of buildings, installed inside a typical air vehicle that is airborne. In one embodiment, the vehicle has a conical curvature at the front and rear ends and is generally cylindrical in shape. The vehicle consists of two halves namely a lower half and an upper half. The upper half comprises a number of concentrated solar collectors 11 and concentrated solar windows/cells 13. The lower half comprises retractable and collapsible legs 14. An elliptical and/or circular opening has been provided for attachment of retractable legs 15 at the base near the front portion of the air vehicle. FIG. 1 also shows a set of cylindrical hoses 12.

Figure 2:
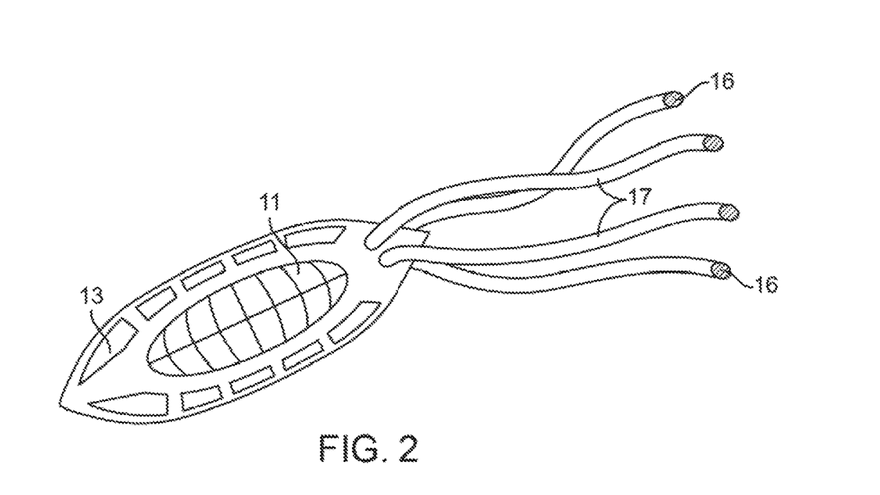
FIG. 2 shows the top view of a vehicle system for air remediation, in accordance with an example embodiment.

FIG. 2 shows the top view of the present disclosure. In one embodiment, the vehicle includes two top cylindrical hoses 17 and two bottom cylindrical hoses 16. In one embodiment, the vehicle further includes adjustable transparent solar windows/cells 13 and concentrated solar collectors 11.

Figure 3:
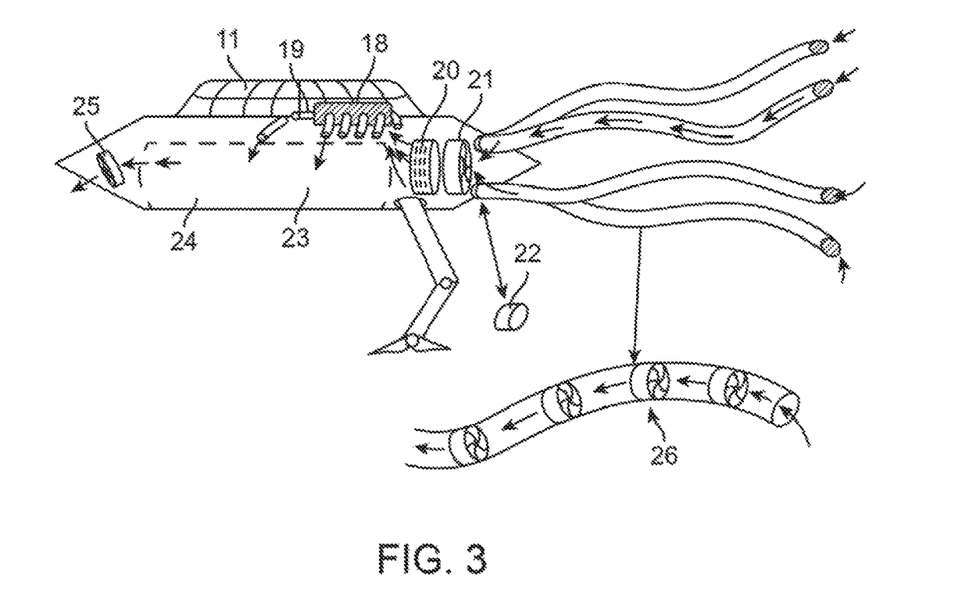
FIG. 3 shows the detailed side view of a vehicle system for air remediation, in accordance with an example embodiment.

FIG. 3 shows the interior of the air vehicle of the present disclosure. In one embodiment, the vehicle may include stainless steel pipes 19, a pump station 18, tourmaline & mesh filters 20, and an intake fan 21. An added attachment 22 is also included to provide a connection for the cylindrical hoses to the internal system. In one embodiment, additional tourmaline filters & fans 23 are provided on a rail. Also, the lower half may be lined with tourmaline filters & water nozzles 24. In one embodiment, a back exhaust fan located at bottom side on the front portion of the vehicle directs clean air to out of the vehicle. A detailed view of the cylindrical hose shows multiple fans 26 inside it.

Figure 4:
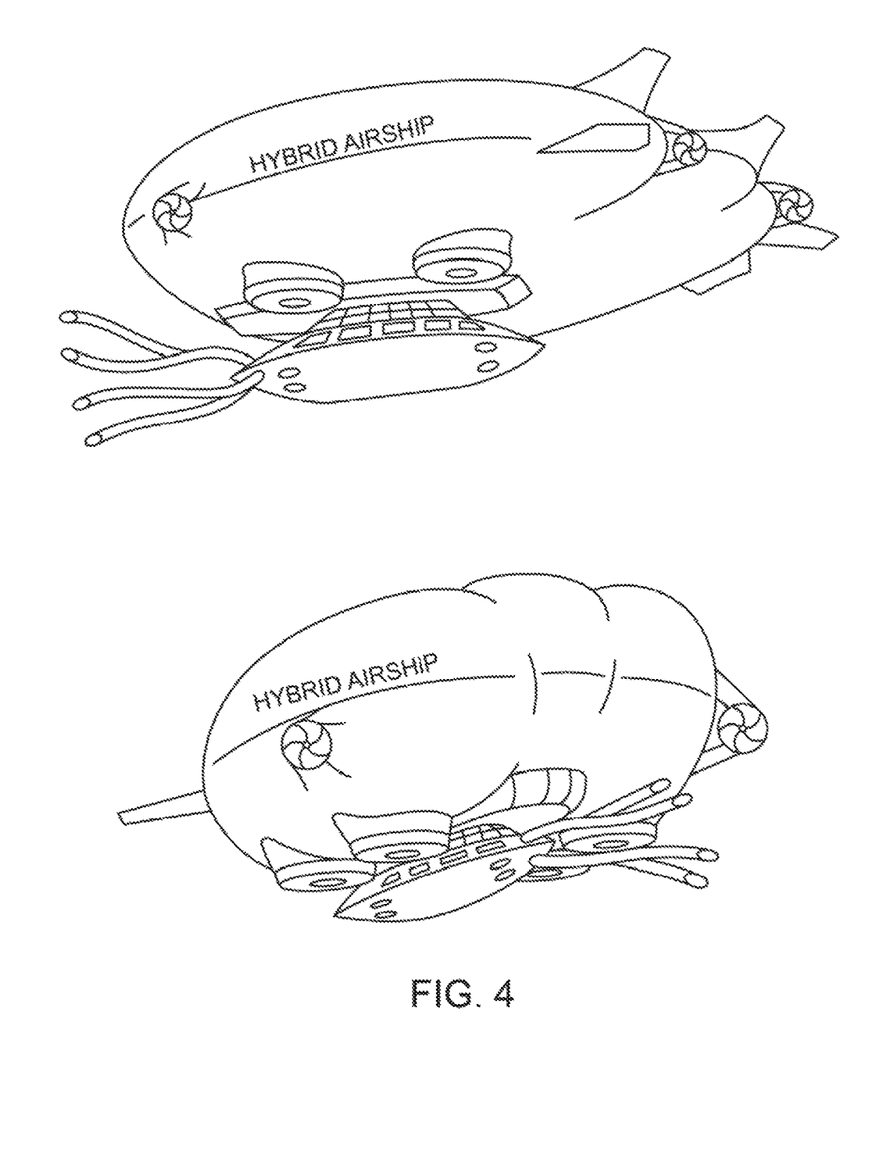
FIG. 4 shows the bottom side view of a vehicle system for air remediation being transported in the air via hybrid airships/air vehicles, in accordance with an example embodiment.

FIG. 4 shows the bottom side view of the present disclosure. In one embodiment, the air vehicle may be secured with a means of lift including a hybrid powered airship and/or another like type of airship. In one embodiment, the air vehicle may be secured to a plane, helicopter, rocket, hot air balloon, blimps, gliders, and other like aerial vehicles.

Figure 5:
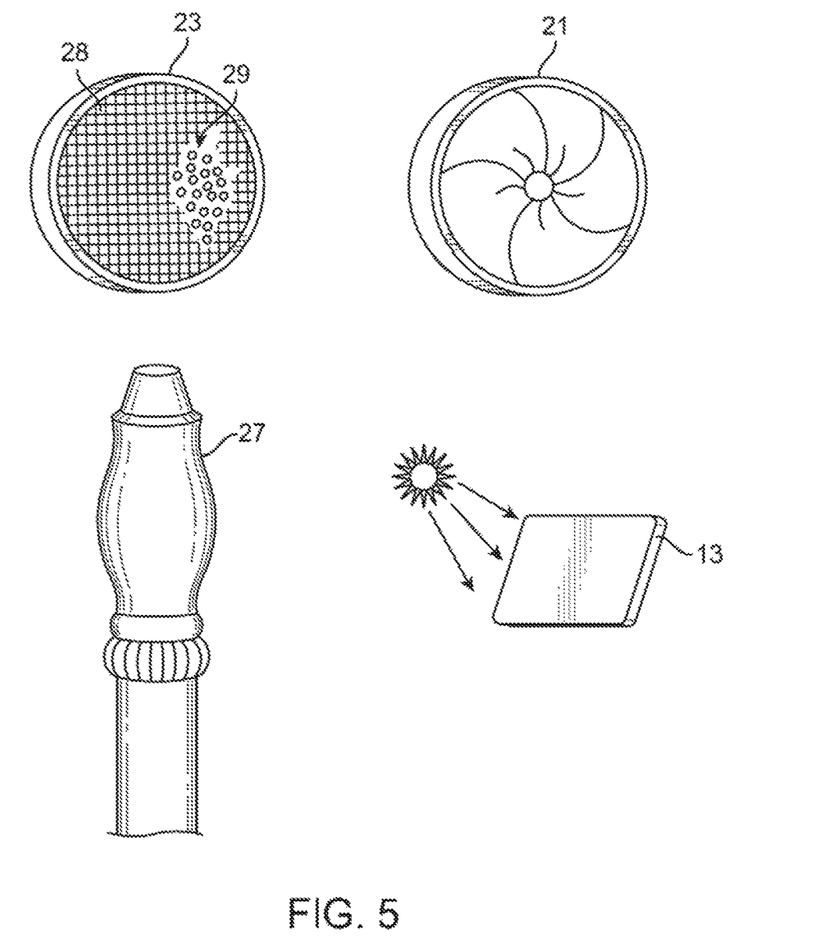
FIG. 5 shows several essential parts to mimic natural air remediation processes, in accordance with an example embodiment.
Figure 6:
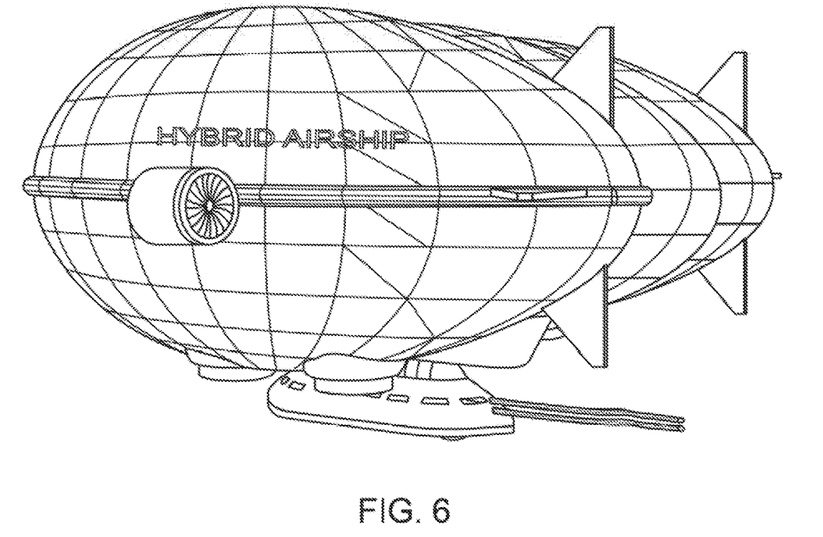
FIG. 6 shows the bottom side view of a vehicle system for air remediation being transported in the air via hybrid airships/air vehicles, in accordance with another example embodiment.
Figure 7:
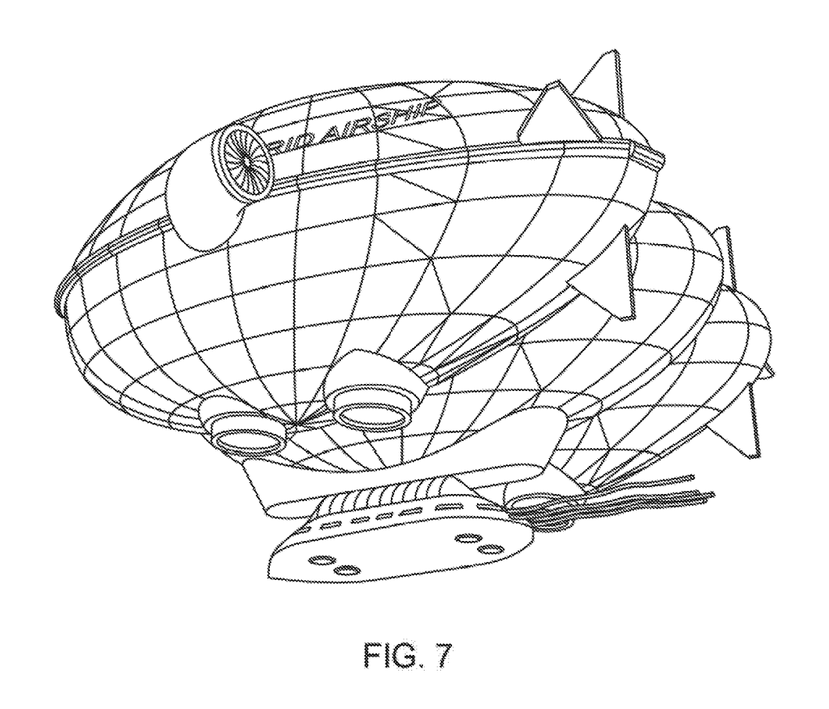
FIG. 7 shows the bottom isometric view of a vehicle system for air remediation being transported in the a hybrid airships/air vehicles, in accordance with another example embodiment.
Figure 8:
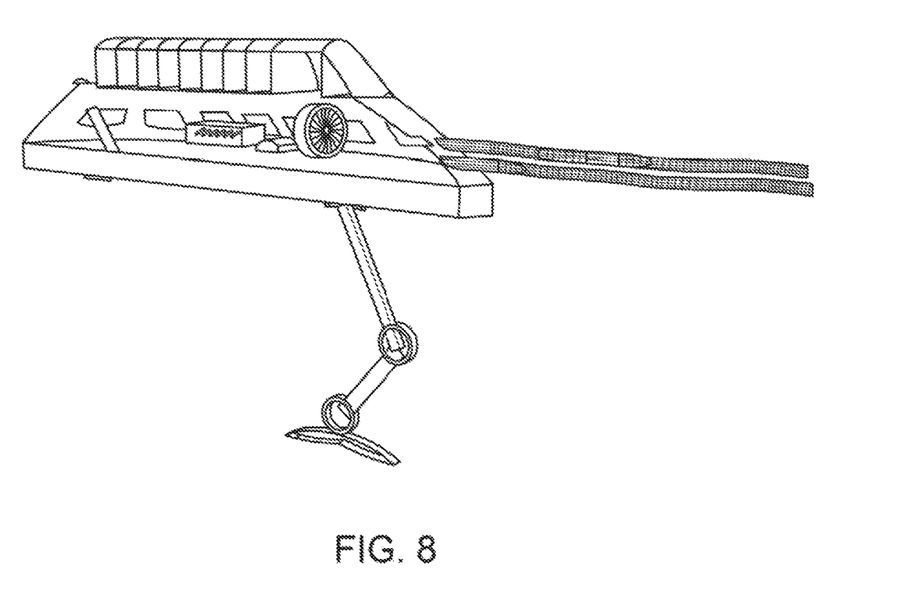
FIG. 8 shows the side view of a vehicle system for air remediation, in accordance with another example embodiment.
Figure 9:
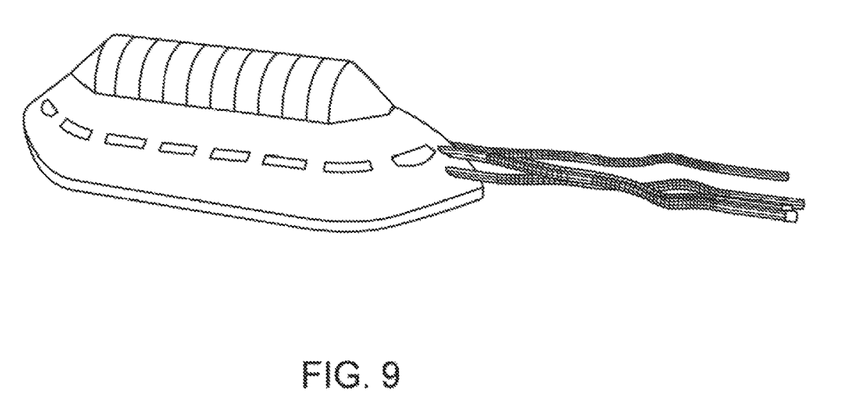
FIG. 9 shows the top side view of a vehicle system for air remediation, in accordance with another example embodiment.
Figure 10:
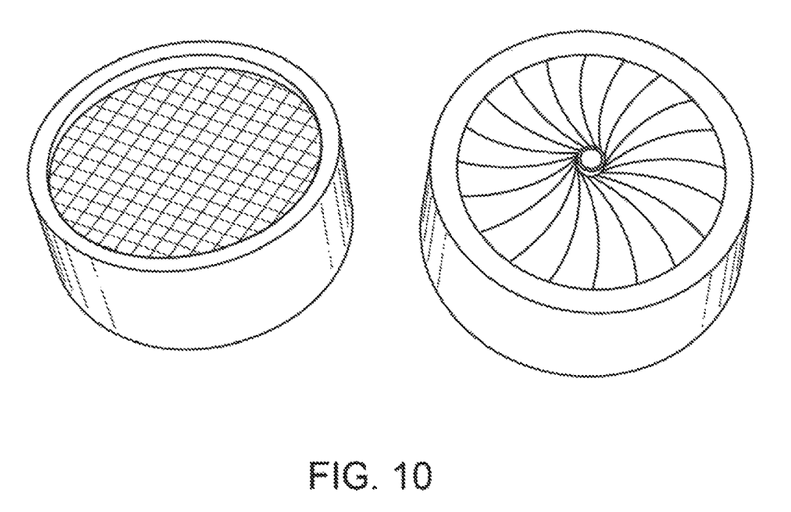
FIG. 10 shows internal fan and wire mesh tourmaline used air remediation processes, in accordance with an example embodiment.
Figure 11:
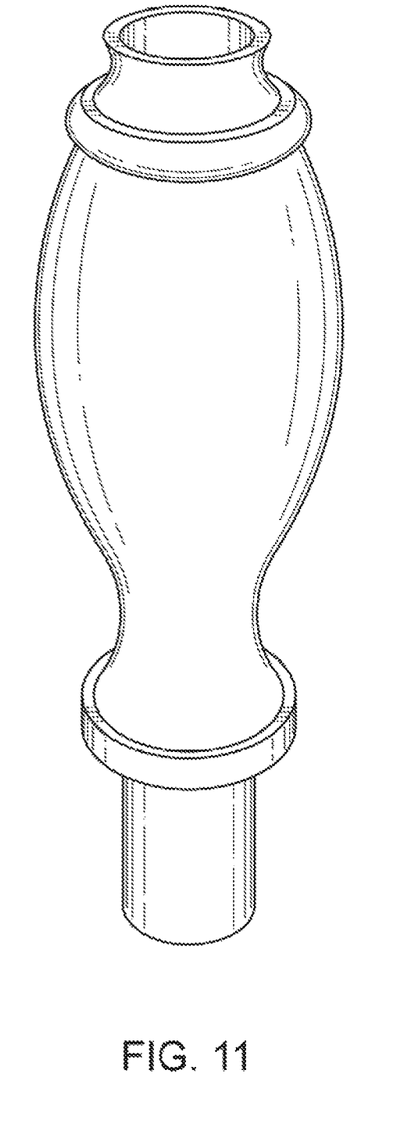
FIG. 11 shows water nozzle used in air remediation processes, in accordance with an example embodiment.

FIG. 5 shows a detailed view of several essential parts to mimic natural air remediation processes. In one embodiment, a filter system includes a tourmaline/mesh filter 23 that includes a wire mesh 28 and tourmaline rocks 29; and a water nozzle 27 made of stainless steel material. Further, the system may also include an internal fan 21 and a transparent window 13.

In one embodiment, the present disclosure is designed to mitigate health risks by reducing air pollution above cities and towns. In one embodiment, the system may be employed during a weather phenomenon known as inversion, such as when a cold weather system causes a dense layer of cold air to become trapped under a layer of warmer air. Thus, the warmer air acts a lid and traps pollutants and compromises the lower atmospheric quality including ground level air quality. In this embodiment, the system may be used to remove much or all of the pollution resulting from this lower atmosphere phenomenon.

In one embodiment, the present disclosure includes an air vehicle with the interior generally divided between a lower and upper half. In one embodiment, the air is provided into the lower half of the interior system where it is cleaned of pollutants. In one embodiment, the vehicle includes concentrated solar collectors solar cells/windows that are attached and distributed on the upper half of the ionizer. In one embodiment, transparent solar cells/windows are distributed on the lower half of the ionizer that power the system and provide light to the interior, while both the amount of power and amount or interior light are adjustable.

In an example embodiment, the transparent solar cells/windows are designed and configured to be able to attached anywhere in the system including top part of the system to take advantage of the sunlight.

In one embodiment, a lower half of a vehicle system includes retractable and/or collapsible, legs (exact number depends on the size of the system) or other like supports for stability while on the ground. In one embodiment, the inside of the lower half of the system is lined with tourmaline and also includes water-nozzles on the top and sides of the lower half of the interior. In one embodiment, the diameter of water released from the nozzles is flexible. For example, the diameter of the nozzle releasing water may range from 3 inches to a much smaller diameter, such as a diameter to produce pure mist. In one embodiment, the nozzles are capable of high water pressure to produce powerful water blasts like a fire hose (approximately 290 psi) and yet include the capability to produce a low pressure blast such as for mist and dripping (approximately 10 psi). In one embodiment, the nozzles are capable of emitting microbubbles (bubbles smaller than one millimeter in diameter, but larger than one micrometer).

In one embodiment, the vehicle system includes at least one rail to enable additional fans and a series of tourmaline mesh filters to be positioned in the lower half of the vehicle system. In one embodiment, the mesh filters may also include tourmaline rocks distributed evenly throughout. In one embodiment, the mesh filters may cover the front of the system where the fans pull in the polluted air and also the back pan of the system exhaust vent where clean air is released. In one embodiment, the exhaust vent has the capability to have a series of tourmaline mesh filters evenly spaced and close together so that exhaust air may be further cleaned before being released into the environment.

In one embodiment, the inside of the lower half of the vehicle system comprises: a waterproof video cameras to monitor operations, an air ion counter, heating and cooling capability to control the temperature, a humidity level monitoring capability, and a relative humidity gauge.

In one embodiment, relative humidity may be considered by measuring the amount of water vapor the air actually has (the absolute humidity) compared to the amount of moisture the air can hold at that temperature. In one embodiment, the relative humidity can be considered based on the atmospheric pressure, wind, and temperature. Thus, in one embodiment, the relative humidity can be considered to target the humidity at which negative ions can stably exist, such as when the humidity is approximately 40-60%. Thus, the flow rate of the water, temperature, fan speed, and the amount of air being taken in and released are adjustable to accomplish optimal remediation. In one embodiment, the nozzles can be adjusted together or separately.

In one embodiment, the upper half of the system is used to store the water to be used for cleaning, when water is used in the process. In one embodiment, a pump station in the upper half transfers water via stainless steel pipes to the lower half of the system, and provides the applicable water pressure. Thus, the upper half of the system also has concentrated solar collectors attached to the outside of the system. The collectors harness solar energy to power the ionizer and control the heating and cooling capability in the lower half of the system.

In one embodiment, the vehicle system includes controls that may be adjusted either onboard and/or remotely to allow adjustments to: the speed and location of the fans, the location, direction, length, and diameter of the cylinder tube fans; the amount of air the fans are taking in and also releasing as exhaust; the location of the tourmaline mesh filters; the temperature of the lower half of the system; the amount of pressure/power each individual water nozzle is releasing, such as the diameter, rate (volume/s), intensity, duration and direction of water being released; the humidity level; and the amount of sunlight being let in.

In one embodiment, polluted air is pulled into the lower half of the system via tourmaline fans. In one embodiment, one large fan may locate at the front of the system to pull in air. Additionally, the vehicle system may include multiple, flexible, expandable/retractable, and stainless steel cylinder tubes that are lined with tourmaline, and tourmaline fans, which can be connected on all four sides on the front of the system. In this embodiment, the pollution and dust can be pulled into the system from all directions. In one embodiment, the number, diameter, and length of the tubes are flexible depending on the size of the hybrid airship/air vehicle being utilized and/or the volume of the area being remediated.

In one embodiment, water may be applied to at least one fan while it is moving. In one embodiment, the vehicle system creates negative ions by using sunlight in the presence of tourmaline, and water. Thus, sun light is introduced into the system, which creates negative ions by breaking apart molecules in the air. Further, tourmaline may be used as a natural source of negative ions. In one embodiment, tourmaline may attract dust particles while being electrically charged. Thus, the electrical charging of tourmaline may be performed by heating, cooling and/or introducing a pressurized environment. In one embodiment, tourmaline may be heated and/or cooled in a number of circumstances such as: when the heating and cooling system modifies the temperature to create the optimum humidity level for stable negative ions to exist; when the temperature of the air changes; and when the system uses water, and the water is a different temperature than the air. In one embodiment, tourmaline will have pressure applied to it in circumstances including: when the tourmaline fans are in motion; when air flows through the mesh filters; and when the vehicle system uses water on the tourmaline filters and rocks.

In one embodiment, the vehicle system uses water to create negative ions when it splashes against the tourmaline mesh filters and rocks and thus mimics the action of a waterfall via the Lenard Effect (generation of electric charges by the splashing of water). Thus, the negatively charged ions attract pollution particles when pulled into the system via powerful fans because nearly all of the airborne particles (e.g. dust, bacteria, chemical pollutants, virus and fungus spores, and the particles of moisture in which they are frequently trapped) that affect human health are positively charged. In this embodiment, the pollution and dust then become too heavy to stay suspended in the air and fall to the ground and/or are drawn to the walls of rooms or buildings. Thus, the vehicle system cleans the surrounding air, and removes the pollution and dust from being present in locations where it may impact human health.

In one embodiment, the system may eliminate the small percentage of pollution not captured by the negative ions. The vehicle system may accomplish this by producing raindrops and/or mist to simulate precipitation and thus capture the remaining pollution. The system may cause this to occur by mimicking natural processes in which precipitation scavenges pollution, such as when atmospheric moisture like rain, fog or snow removes substances from the air.

In general, precipitation is the atmosphere's single most efficient way of removing particulate pollution and thus by periodically creating raindrops and mist/fog, the present disclosure will capture the small amount of pollution that is not immediately captured by the negative ions.

In one embodiment, captured pollution on the entire inside of the system may be cleaned using a biodegradable (100%) and/or environmentally friendly cleaning solution. In one embodiment, the cleaning solution may eliminate the pollution from the environment without creating a negative environmental impact.

Traditional air cleaners/purifiers have a number of drawbacks including: a release of ozone into the troposphere (ground/surface level to approximately 6 miles above the earth's surface) which may damage human health, vegetation and many common materials; the lack of fans to collect airborne particles from more than a few feet away. And, further a lack of power to attract more particles as particles are collected.

Unlike traditional air cleaners/purifiers, the system of the present disclosure: does not release harmful ozone (the disclosure's negative ionizer is a green technology and does not produce harmful ozone); and utilizes fans that attract pollution and dust from greater distances and locally (the flexible hoses allow pollution/dust to be pulled into the system from all directions).

In one embodiment, the atmospheric negative ionizer may be used with hybrid airships/air vehicles and thus the system may fly to the exact location of the polluted air, thus enabling the ionizer to directly capture pollution.

In one embodiment, the vehicle system may be able to capture large amounts of dust and pollution in an efficient way by: using powerful thus to pull in pollution/dust; dispersing the captured pollution/dust throughout the system to prevent build up in one specific location; and using water on the fans while in motion to continuously clean them of pollution/dust buildup.

Thus, the use of tourmaline filters, sunlight and water droplets to create an ionized surface within a cylindrical tube is unique to the present disclosure. Thus, the disclosure utilizes a unique construction with a combination of systems that may be used to reduce air pollution effectively.

It is to be understood that the above description is intended to be illustrative, and not restrictive. For example, the above-discussed embodiments may be used in combination with each other. Other embodiments are apparent to those of ordinary skill in the art upon reviewing the above description.

The benefits and advantages which may be provided by the present disclosure have been described above with regard to specific embodiments. These benefits and advantages, and any elements or limitations that may cause them to occur or to become more pronounced are not to be construed as critical, required, or essential features of any or all of the embodiments.

While the present disclosure has been described with reference to particular embodiments, it should be understood that the embodiments are illustrative and that the scope of the disclosure is not limited to these embodiments. Many variations, modifications, additions and improvements to the embodiments described above are possible. It is contemplated that these variations, modifications, additions and improvements fall within the scope of the disclosure.

It is to be understood that the above description is intended to be illustrative, and not restrictive. For example, the above-discussed embodiments may be used in combination with each other. Many other embodiments will be apparent to those of skill in the art upon reviewing the above description.

While this specification contains many specific implementation details, these should not be construed as limitations on the scope of any inventive concept of what may be claimed, but rather as descriptions of features that may be specific to particular embodiments of particular inventive concept. Certain features that are described in this specification in the context of separate embodiments can also be implemented in combination in a single embodiment. Conversely, various features that are described in the context of a single embodiment can also be implemented in multiple embodiments separately or in any suitable sub combination.

What is claimed is:

1. A system, for removal pollutants from air in environment, the system comprising:
   an upper half portion;
   a lower half portion forming an interior of the system together with an upper half;
   hoses, connected to one or more of the upper half and the lower half and configured to flow the air from the environment to the interior;
   tourmaline filters, positioned in the lower half and comprising tourmaline; transparent solar windows, positioned in the upper half and configured to receive sunlight from the environment and to direct the sunlight at the tourmaline filters in an adjustable manner, thereby controlling temperature of the tourmaline inside the tourmaline filters; and
   water nozzles, positioned in the interior and configured to dispense water within the interior and onto the tourmaline filters at a controlled speed and a controlled direction, wherein the water nozzles have a controllably adjustable diameter,
   wherein the system is configured
   to form negative ions and artificial precipitation scavenging within the interior and using a combination of the sunlight, the water, and the tourmaline when the tourmaline is at least heated by the sunlight or pressurized by the water disposed from the water nozzles, and
   using the negative ions and the artificial precipitation scavenging, to attract the pollutants from the air thereby removing the pollutants from the air in accordance with a natural air remediation, while the air passes through the interior.

2. The system of claim 1, further comprising retractable legs connected to the lower half and configured to support the system while on ground.

3. The system of claim 1, further comprising a pump station, configured to control pressure of the water dispensed through the water nozzles.

4. The system of claim 1, further comprising an intake fan configured to flow the air through the tourmaline filters.

5. The system of claim 1, further comprising an exhaust fan for directing the air from the interior of the system back to the environment.

6. The system of claim 1, wherein the hoses comprise hose fans disposed insides the hoses and configured to flow the air through the hoses and into the interior of the system.

7. The system of claim 1,
   wherein the tourmaline is in a form of tourmaline rocks, and
   wherein the tourmaline filters comprise a wire mesh, and wherein the tourmaline rocks are supported by and distributed within the wire mesh.

8. The system of claim 1, wherein the water nozzles are configured to produce at least one of
mist, comprising water droplets, to simulate precipitation and
water blasts to simulate a waterfall.

9. The system of claim 1, wherein the water nozzles are configured to produce at least one of
a first water blast at a pressure of about 290 psi and
a second water blast at a pressure of about 10 psi.

10. The system of claim 1, further comprising rails, supporting the tourmaline filters within the interior.

11. The system of claim 10, further comprising one or more interior fans positioned in series with the tourmaline filters on the rails.

12. The system of claim 11, wherein one or more interior fans are configured to control air pressure applied to surface of the tourmaline in the tourmaline filters.

13. The system of claim 12, wherein the water nozzles are directed in part at the one or more interior fans.

14. The system of claim 1, wherein the water nozzles are configured to dispense the water to a surface of the tourmaline in the tourmaline filters.

15. The system of claim 1, further comprising a video camera, disposed within the interior of the system and configured to caputre video image of the interior.

16. The system of claim 1, further comprising an air ion counter, disposed within the interior of the system and configured to monitor a concentration of the negative ions in the interior.

17. The system of claim 1, further comprising a heater, disposed within the interior of the system and configured to control temperature of the interior.

18. The system of claim 17, wherein the heater is configured to control temperature of the tourmaline of the tourmaline filters.

19. The system of claim 1, further comprising a relative humidity gauge, disposed within the interior of the system and configured to monitor relative humidity of the interior.

20. The system of claim 1, wherein the first portion comprises solar windows, and wherein the concentrated solar collectors are disposed with the interior and directed at the solar windows.

21. The system of claim 1, further comprising a system controller, configured to control one or more processing parameters selected from the group consisting of a water-flow rate through the water nozzles, a water pressure from the water nozzles, an airflow rate through the tourmaline filters, a temperature of the interior, and a sunlight directed at the concentrated solar collectors.

22. The system of claim 1, wherein the system is an aerial vehicle.

23. The system of claim 1, wherein the water nozzles are configured to dispense the water onto the tourmaline filters such that the water has a temperature different than that of the air in the interior.

24. The system of claim 1, wherein the water nozzles are configured to dispense the water onto the tourmaline filters such that the water has a temperature different than that of the air in the interior.

25. The system of claim 21, wherein the system controller is configured to control a water flow rate through the water nozzles.

26. The system of claim 21, wherein the system controller is configured to a water pressure from the water nozzles.

* * * * *